UNITED STATES PATENT OFFICE.

GEORG HOLSTE, OF VOHWINKEL, NEAR ELBERFELD, GERMANY, ASSIGNOR TO FARBENFABRIKEN VORM. FRIEDR. BAYER & CO., OF ELBERFELD, GERMANY, A CORPORATION OF GERMANY.

DYE.

1,012,853.   Specification of Letters Patent.   Patented Dec. 26, 1911.

No Drawing.   Application filed January 24, 1911.   Serial No. 604,436.

*To all whom it may concern:*

Be it known that I, GEORG HOLSTE, doctor of philosophy, chemist, citizen of the German Empire, residing at Vohwinkel, near Elberfeld, Germany, have invented new and useful Improvements in New Dye, of which the following is a specification.

I have found that new and valuable products having most probably in the shape of their sodium salts the formula:

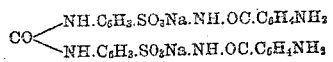

can be obtained by condensing nitrobenzoyl chlorids, such as:

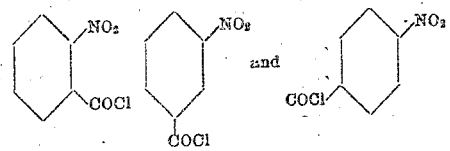

with diaminodiphenylureadisulfonic acid and reducing the products thus obtained.

The new products are distinguished by the remarkable property, that they have the same affinity for the fiber as the so-called substantive dyes and that they can be fixed on the fiber in the same way as these colors. Cotton thus prepared can be diazotized on the fiber and combined with suitable azo-dyestuff components.

Beta-naphthol furnishes a fast red, 1-phenyl-3-methyl-5-pyrazolone a greenish-yellow fast to light, washing and cross-dyeing.

The new products are after being dried and pulverized in the shape of their alkaline salts grayish powders soluble in water, being split up by hot caustic soda lye into diaminodiphenylurea disulfonic acid and aminobenzoic acid.

In order to illustrate the new process more fully the following example is given, the parts being by weight:—75 parts of diaminodiphenylurea disulfonic acid (sodium salt) are stirred up with 800 parts of hot water and 20 parts of sodium carbonate. Subsequently 50 parts of molten para-nitrobenzoylchlorid are slowly added during stirring. When the reaction is complete 200 parts of iron filings and 100 parts of acetic acid are added to the mass of the reaction which is rendered alkaline with soda and filtered. From the filtrate the sodium salt of the new compound is precipitated by the addition of common salt.

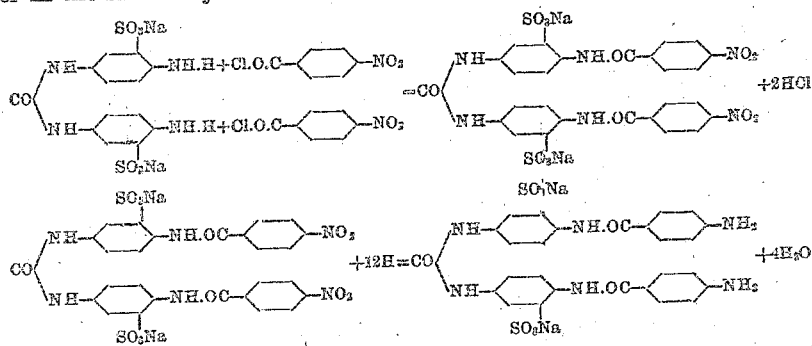

I claim:—

The herein described new products being chemically aminobenzoyl compounds of diaminodiphenylurea disulfonic acid, which are after being dried and pulverized in the shape of their alkaline salts grayish powders soluble in water; possessing affinity for the fiber; and which can be diazotized on the fiber and combined with azo dyestuff components, valuable fast shades being thus obtained, substantially as described.

In testimony whereof I have hereunto set my hand in the presence of two subscribing witnesses.

GEORG HOLSTE. [L. S.]

Witnesses:
 CHAS. J. WRIGHT,
 ALFRED HENKEL.